(12) United States Patent
Swab

(10) Patent No.: US 6,231,181 B1
(45) Date of Patent: May 15, 2001

(54) EXCHANGEABLE EYEGLASS TEMPLE PIECES UTILIZING QUICK-CONNECT ATTACHMENT

(75) Inventor: Gregg T. Swab, Tulsa, OK (US)

(73) Assignee: QR Spex, Inc., Tulsa, OK (US)

( * ) Notice: Subject to any disclaimer, the term of this patent is extended or adjusted under 35 U.S.C. 154(b) by 0 days.

(21) Appl. No.: 09/532,427

(22) Filed: Mar. 23, 2000

(51) Int. Cl.$^7$ ............................................ G02C 5/14
(52) U.S. Cl. .............................. 351/116; 351/153; 16/228
(58) Field of Search ................................. 351/116, 111, 351/153, 110; 16/228

(56) References Cited

U.S. PATENT DOCUMENTS

| | | |
|---|---|---|
| 3,762,804 | 10/1973 | Livas . |
| 4,153,347 | 5/1979 | Myer . |
| 4,488,792 | 12/1984 | Wagner . |
| 4,564,272 | 1/1986 | Kan . |
| 5,007,728 | 4/1991 | Magorien . |
| 5,035,498 | 7/1991 | Robert . |
| 5,059,017 | * 10/1991 | Bennato ............................ 351/121 |
| 5,359,370 | 10/1994 | Mugnier . |
| 5,418,581 | 5/1995 | Conway . |
| 5,539,561 | 7/1996 | Khalifa . |
| 5,579,062 | 11/1996 | Sondrol . |
| 5,594,511 | 1/1997 | Lin . |
| 5,652,637 | 7/1997 | Marini . |
| 5,936,701 | 8/1999 | Sartor . |

* cited by examiner

Primary Examiner—Hung Xuan Dang
(74) Attorney, Agent, or Firm—Dennis D. Brown; Fellers, Snider, Blankenship, Bailey & Tippens

(57) ABSTRACT

An apparatus for releasably attaching a temple to a lense frame. In one aspect, the inventive apparatus comprises: a grasping mechanism, at the forward end of the temple, for releasably, pivotably, and directly grasping a hinge pin provided on the lense frame, and a finger-operatable actuator for actuating the grasping mechanism to selectively release and pivotably grasp the hinge pin. When the grasping mechanism is secured to the hinge pin, the forward end of the temple will preferably be positioned directly adjacent to the lense frame such that the grasping structure is substantially hidden from outside view. Alternatively, the apparatus can comprise: an insert structure pivotably attached to the lense frame; a cavity provided in the forward end of the temple for receiving the insert structure; and a catch mechanism for releasably retaining the insert structure in the cavity. When the insert structure is retained in the cavity, the forward end of the temple will preferably be positioned directly adjacent to the lense frame such that the insert structure is substantially hidden from outside view.

10 Claims, 6 Drawing Sheets

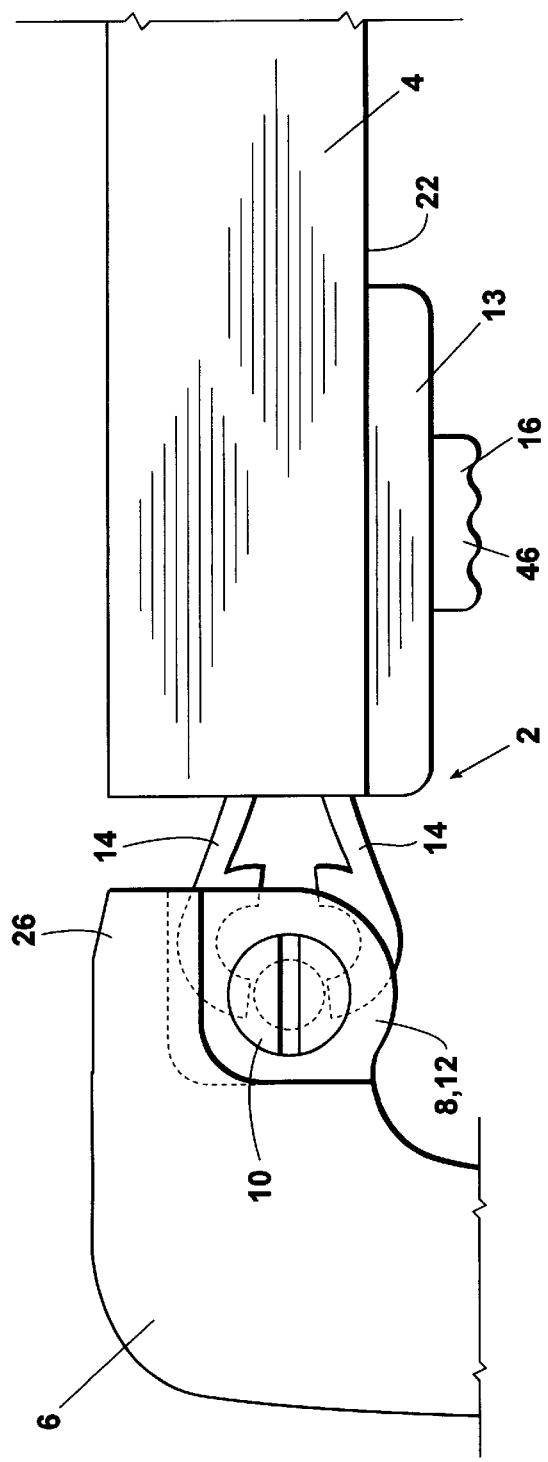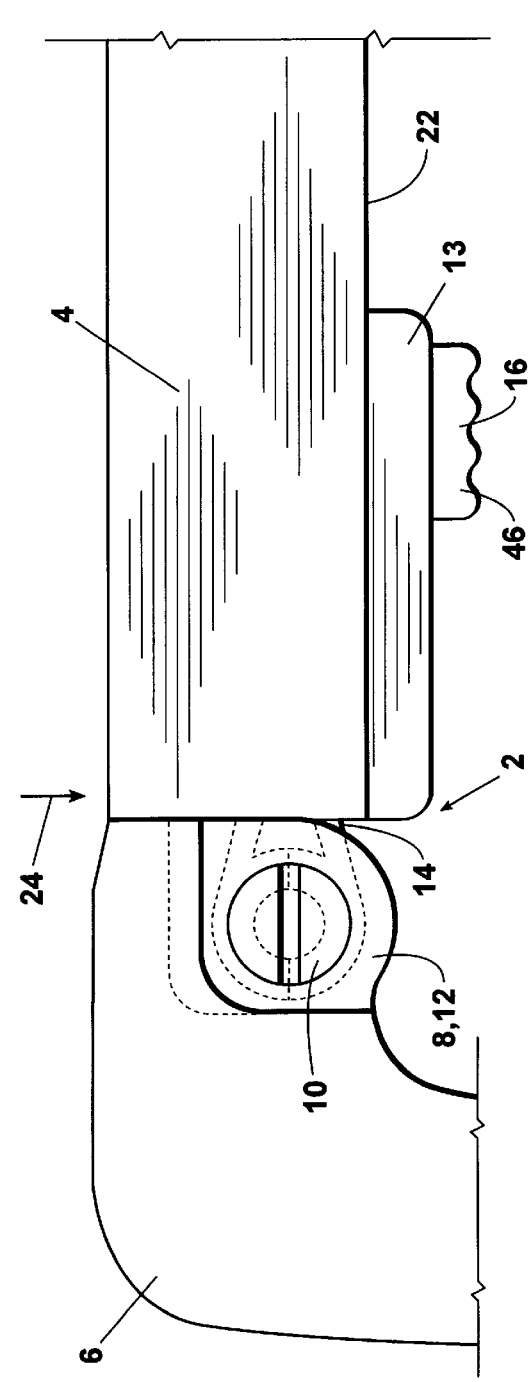

EXCHANGEABLE EYEGLASS TEMPLE PIECES UTILIZING QUICK-CONNECT ATTACHMENT

FIELD OF THE INVENTION

The present invention relates to eyeglasses having removable temple pieces. More particularly, but not by way of limitation, the present invention relates to substantially invisible, quick-connect attachment structures for connecting and removing eyeglass temple pieces.

BACKGROUND OF THE INVENTION

A need presently exists for eyeglasses having temple pieces which are quickly and easily removable and reconnectable. Such eyeglass systems will preferably allow the user to quickly and conveniently (a) interchange temple pieces of different fashion, look, and/or style, (b) exchange fashion wear temple pieces with more durable sports-type or safety-type temple pieces (with secure side shields, if desired), and (c) attach temple pieces of different size and/or shape for growing children or for different users. Moreover, the releasable attachment mechanism will preferably be both very secure but easily releasable by simple finger operation.

Although certain types of removable temple structures have been suggested heretofore, these prior systems have not met the needs mentioned above and have typically had numerous other significant shortcomings. U.S. Pat. No. 5,594,511, for example, discloses a rather complicated, two-part temple piece requiring the installation of a visible intermediate "connector" of significant size. U.S. Pat. No. 5,418,581 discloses temple pieces having visible hook structures on the ends thereof which must be attached to permanent, visible T-shaped hinges molded onto the sides of the lens frame. U.S. Pat. No. 5,652,637 discloses a three-piece attachment system consisting of a visible "female member" molded onto the side of the lens frame, a visible intermediate "male member" which snaps into the female member, and an outer ear piece which is attached by a hinge pin to the outer end of the "male member." U.S. Pat. No. 4,488,792 discloses a two-piece temple structure consisting of a visible forward segment permanently attached to the side of the lens frame and a rearward ear piece which is hinged to the forward segment by means of a spring arm visibly extending along the top of the ear piece. U.S. Pat. No. 5,007,728 discloses a two-piece temple structure consisting of a visible front piece hinged to the side of the lens frame and an ear piece which locks on to the front piece by means of a visible locking structure.

Thus, the prior systems suggested heretofore typically include visible connecting structures and/or visible intermediate connecting pieces which (a) significantly and undesirably affect the look and operation of the eyeglass system, (b) allow only the rearward ear portion of the temple piece to be truly interchangeable, (c) do not provide both easy installation and secure attachment, and/or (d) do not allow simple finger operation.

SUMMARY OF THE INVENTION

The present invention satisfies the needs and alleviates the problems discussed hereinabove. In one aspect, the present invention provides an apparatus for releasably attaching a one-piece temple directly to a lense frame, the one-piece temple having a forward end and the lense frame having a hinge and hinge pin provided thereon. The apparatus comprises: (a) grasping means, at the forward end of the one-piece temple, for releasably, pivotably, and directly grasping the hinge pin such that the forward end of the one-piece temple is positioned directly adjacent to the lense frame and the grasping means is substantially hidden from outside view and (b) finger-operatable actuating means for actuating the grasping means to selectively release and pivotably grasp the hinge pin.

In another aspect, the present invention provides an apparatus for releasably attaching a temple to a lense frame comprising: an insert structure pivotably attached to the lense frame; a cavity provided in the forward end of the temple for receiving the insert structure; and holding means for releasably retaining the insert structure in the cavity. When the insert structure is retained in the cavity, the forward end of the temple is positioned directly adjacent the lense frame such that the insert structure is substantially hidden from outside view.

In yet another aspect, the present invention provides an apparatus for releasably attaching a one-piece temple directly to a lense frame comprising: a slot provided in a side of the lense frame and a hinged connector provided at the forward end of the one-piece temple. The hinge connector is releasably snappable into the slot.

Further objects, features, and advantages of the present invention will be apparent upon examining the accompanying drawings and upon reading the following detailed description of the preferred embodiments.

BRIEF DESCRIPTION OF THE DRAWINGS

FIG. 4 provides a first top view of inventive device 2 with jaws 14 in open position.

FIG. 5 provides a second top view of inventive device 2 with jaws 14 closed.

DETAILED DESCRIPTION OF THE PREFERRED EMBODIMENTS

Figure 1:
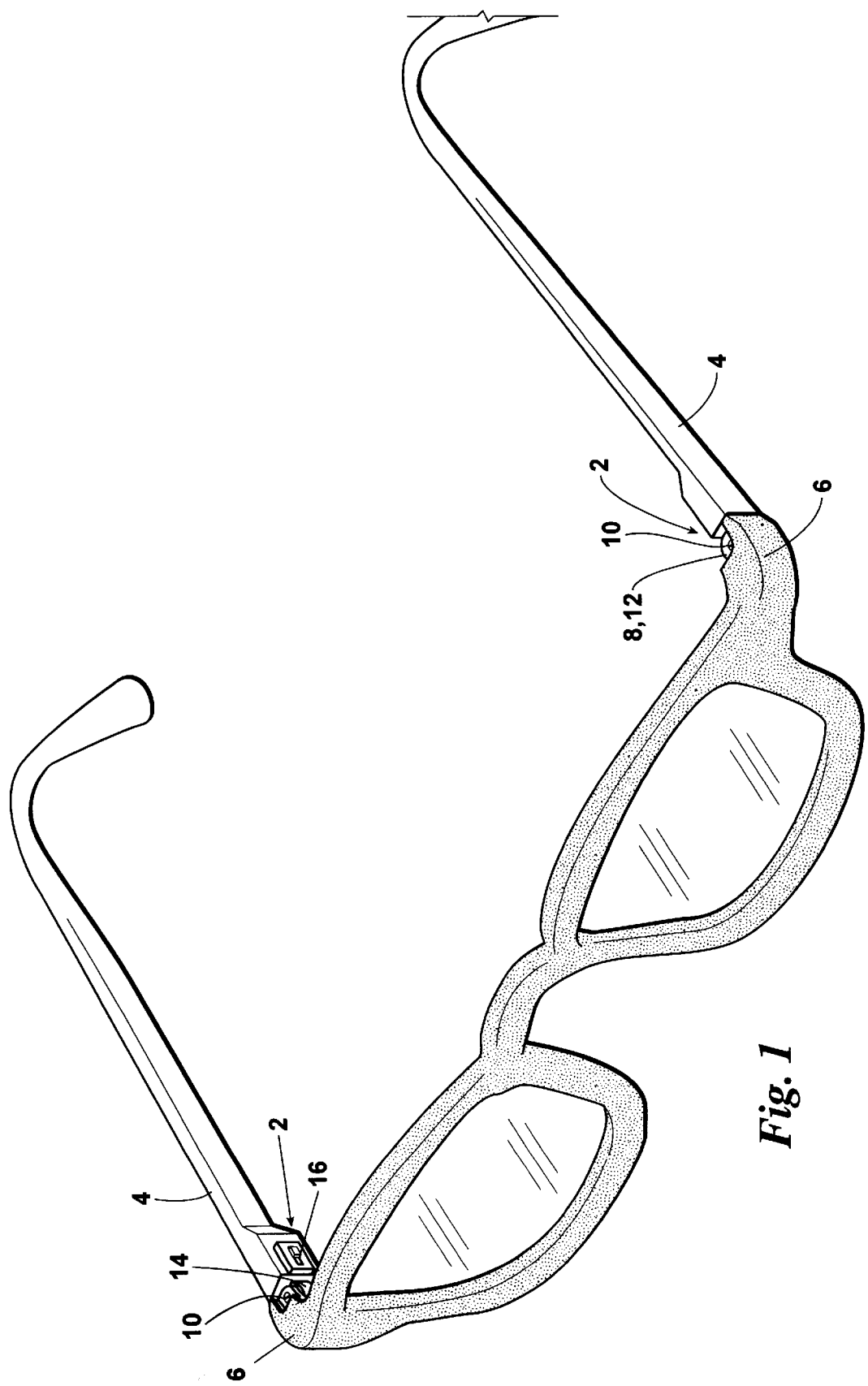
FIG. 1 provides a perspective view of an eyeglass assembly employing embodiments 2 of the inventive connecting device.
Figure 2:
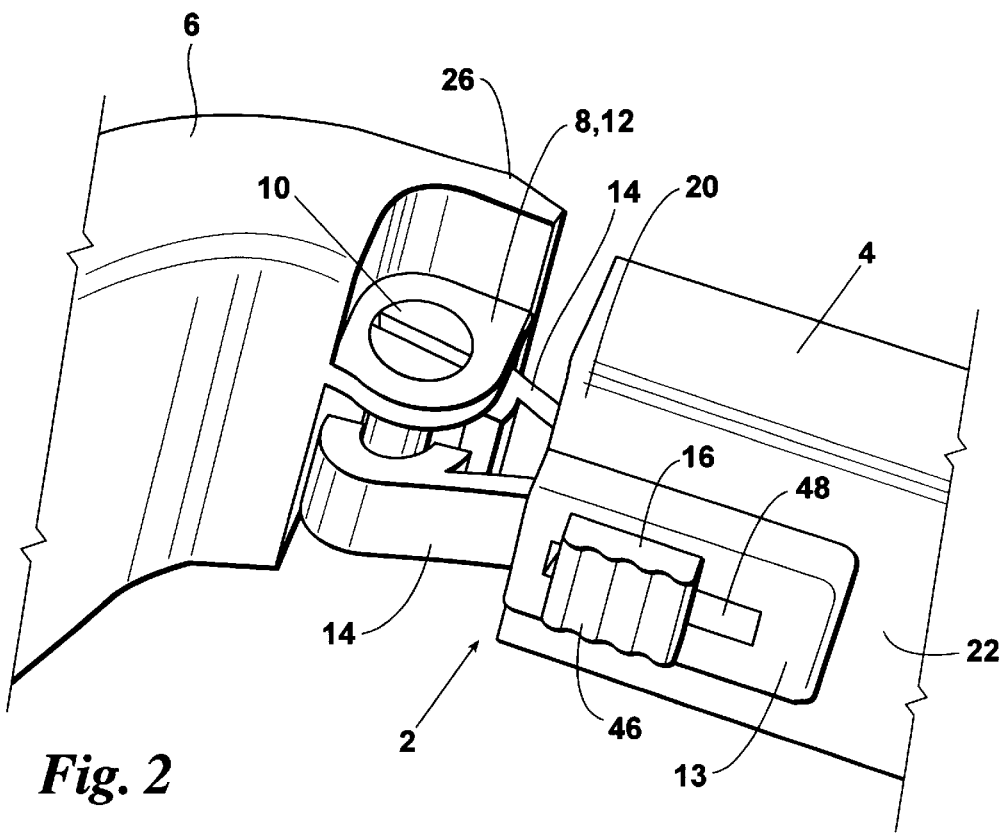
FIG. 2 provides a first perspective view of inventive device 2 with the jaw structures 14 thereof in open position.
Figure 3:
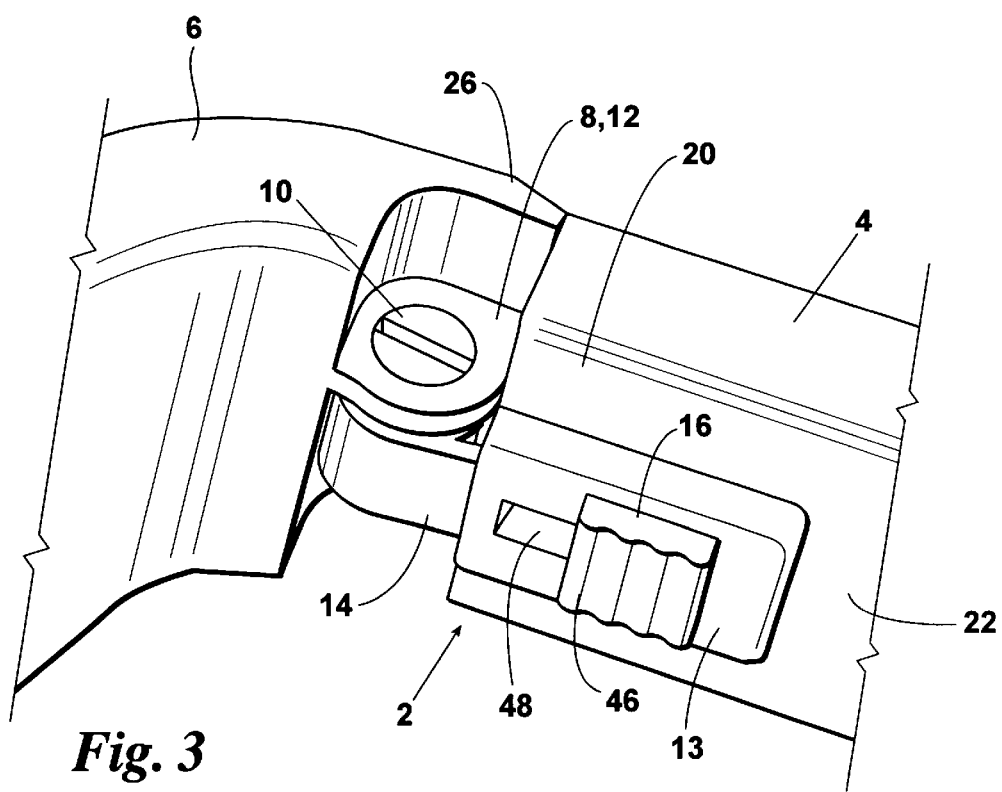
FIG. 3 provides a second perspective view of inventive device 2 with jaws 14 in closed position.

An embodiment 2 of the inventive apparatus for releasably connecting a pair of one-piece eyeglass temple structures 4 to a lense frame 6 is depicted in FIGS. 1–7. Each of the two temples 4 is preferably a mirror image of the other. In embodiment 2, the lense frame 6 includes a conventional hinge pin structure 8 comprising a bolt, screw, or other pin element 10 threadedly or otherwise secured through two or more hinge knuckle elements 12. Inventive apparatus 2 preferably comprises: a housing 13; one or more jaw structures 14 which releasably grasp pin element 10 between hinge knuckles 12; a finger-operatable actuator 16 for opening the jaws 14; and a biasing element or assembly 18 which preferably operates to automatically return the jaw structure (s) 14 to their closed position. In embodiment 2 of the inventive apparatus, housing 13 is preferably inset, formed, or otherwise provided in the forward end 20 of temple 4.

As illustrated in FIGS. 2–7, jaw structures 14 preferably extend from the forward end portion 20 of temple 4 and actuator 16 is preferably positioned on the inner side 22 of temple 4 such that, when jaw(s) 14 are attached to pin element 10, the inventive attaching apparatus 2 is substantially hidden from outside view. As used herein and in the claims, the phrase "substantially hidden from outside view" means that, when each of the two temples 4 are attached to lense frame 6 and the assembled eyeglass structure is placed in normal position on the user's head, the inventive attachment apparatus will, when viewed laterally from the direction of arrow 24 shown in FIG. 5, either (a) be essentially invisible or (b) appear to be only a conventional temple hinge. When desired, the hinge temple can be completely concealed from outside view using, for example, an outer covering structure 26 which either extends rearwardly from the outside end of the lense frame 4 or forwardly from the forward end of temple 4.

Figure 6:
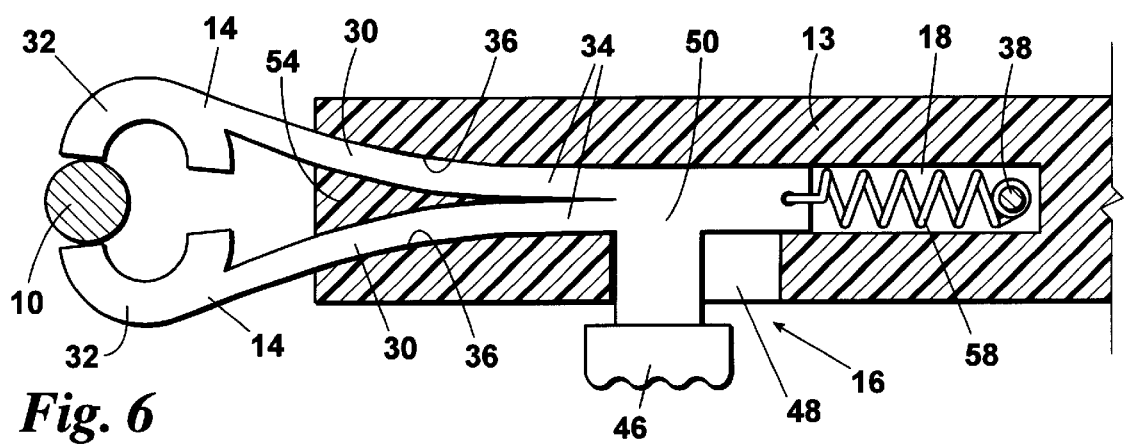
FIG. 6 schematically illustrates the structure and operation of one embodiment of inventive device 2 wherein jaws 14 are open.
Figure 7:
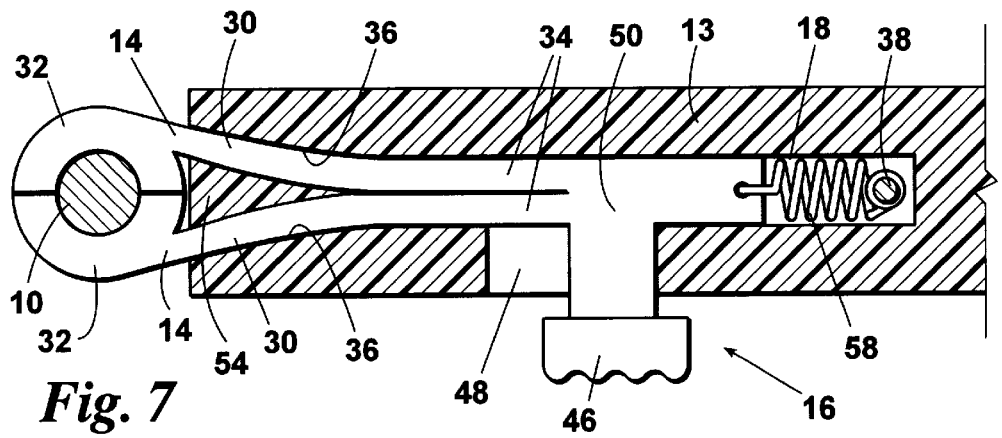
FIG. 7 schematically illustrates the structure and operation of this same embodiment of inventive device 2 but with jaws 14 in closed position.

As just one example of the possible structure and operation of jaw(s) 14, FIGS. 6 and 7 schematically illustrate a symmetrical pair of jaws 14, each of which comprises (a) an elongate flexible arm 30 adapted to slide forwardly and rearwardly in housing 13 and (b) a C-shaped structure 32 or other structure provided on the distal end of arm 30. Structure 32 can be generally any structure adapted for securely and pivotably grasping the hinge pin 10 of lense frame 6.

As just one example of the possible structure and operation of actuator 16, FIGS. 2–7 show: a finger-operatable push pad 46 or other slide bar structure installed on housing 13 in one or more slide tracks 48; a structure 50, projecting laterally inward from pad 46 through track 48, to which the proximal ends 36 of jaw arms 30 are molded or otherwise flexibly and/or pivotably attached; outwardly curved or angled interior walls 36 provided in housing 13; and a stationary wedge 54 or other structure provided in housing 13 between jaws 14 for operating with curved interior walls 36 to urge jaws 14 to open (i.e., flex outwardly) as jaws 14 are pushed forward and to force jaws 14 to close as they are pulled rearward.

Although a finger operated sliding actuator 16 has been described for purposes of this disclosure, it will be understood by those skilled in the art that generally any switch-type, button-type, or other type of actuating mechanism (preferably finger-operatable) could alternatively be used in the inventive apparatus.

As illustrated in FIGS. 6 and 7, the biasing element/ assembly 18 can, as one example, be comprised of a tension spring 58 connected between the interior structure 50 of actuator 16 and a pin 38 or other structure provided in housing 13. In this arrangement, spring 58 operates to continuously urge actuator 16 and jaw structures 14 rearwardly toward their closed positions. It will be understood by those skilled in the art, however, that any type of coiled spring, leaf spring, or other known biasing structure can be employed in the inventive apparatus to pull, push or switch the actuator and jaw(s) toward their closed positions.

Figure 14:
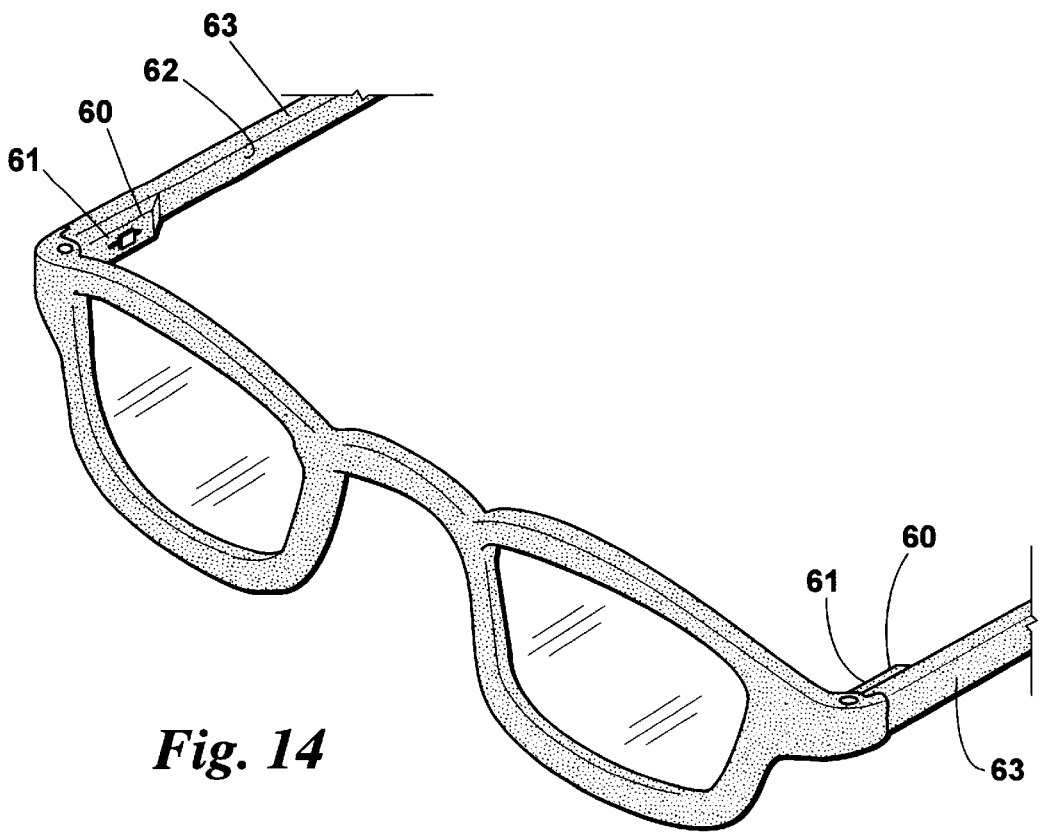
FIG. 14 provides a perspective view of an eyeglass assembly employing another alternative embodiment 60 of the inventive attachment apparatus.

A second embodiment 60 of the inventive apparatus is depicted in FIG. 14. As will be apparent, embodiment 60 is substantially identical to embodiment 20 of the inventive apparatus except that, in embodiment 60, the housing 61 of the inventive apparatus is attached to the inner side 62 of temple 63 rather than being inset, formed, or otherwise provided in the interior of the temple itself. As with embodiment 2, the housing 61 of embodiment 60 is preferably positioned at the forward end portion of temple 63. As also with embodiment 2, embodiment 60 of the inventive apparatus is preferably structured and positioned to be substantially hidden from outside view when the user is wearing the inventive eyeglass assembly.

Another alternative embodiment 70 of the inventive apparatus is depicted in FIGS. 8–12. Embodiment 70 comprises: an insert piece 72 having one or more hinge elements 74 adapted for pivotable attachment to the frame hinge structure 8; a cavity 76 provided in the forward end 78 of temple 80 and preferably sized for fully receiving insert 72; a lip structure 82 provided on the inner side of insert piece 72 adjacent the rearward end thereof; a slot 84 positioned in cavity 76 for receiving lip 82; and a spring element 88 or other biasing structure provided in cavity 76 for urging lip 82 to snap securely into slot 84. Slot 84 preferably extends from cavity 76 through the inside wall 86 of temple 80, thereby allowing the eyeglass wearer to use her finger to depress lip 82 from slot 84 so that temple 80 can be quickly and easily pulled off of insert piece 72. Insert piece 72 is preferably fully receivable in cavity 76 so that the forward end 78 of temple 80 is positioned immediately adjacent the lense frame 6 and the inventive attachment apparatus 70 is thus substantially hidden from outside view. In the same manner as discussed above, an extension 90 can, if desired, be provided on frame 6 or the forward end of temple 80 in order to completely conceal the hinge structure 8.

Figure 13:
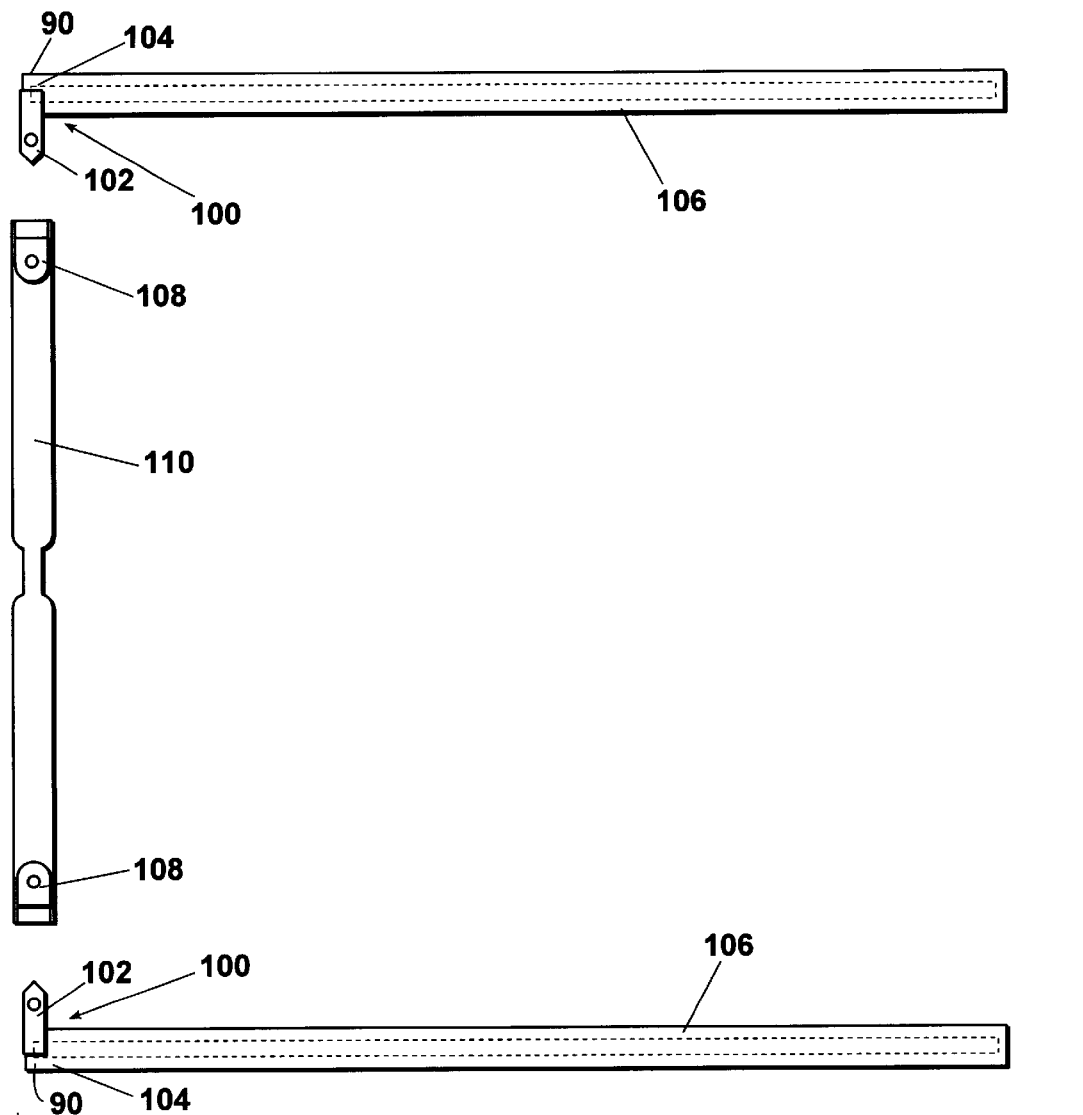
FIG. 13 provides an exploded top view of an eyeglass assembly employing another alternative embodiment 100 of the inventive attachment apparatus.
Figure 8:
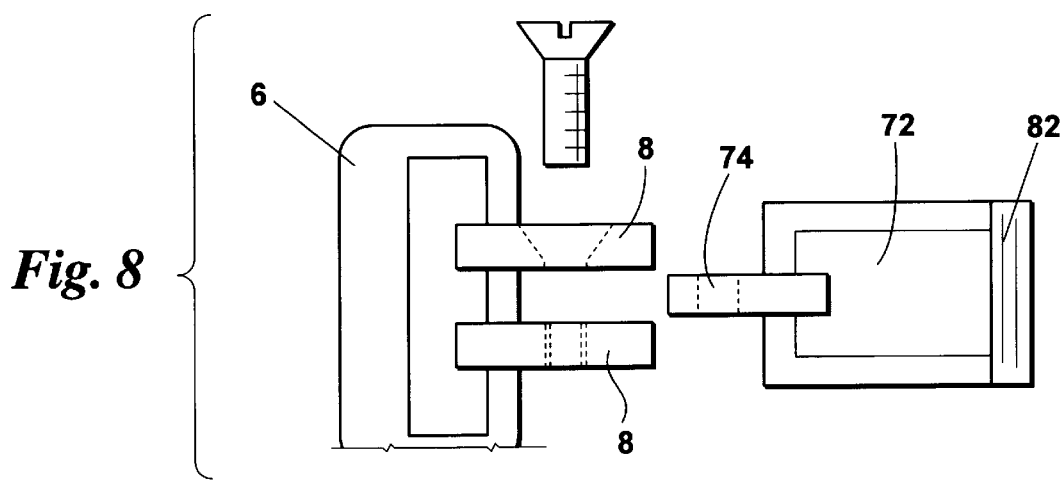
FIG. 8 provides an exploded view of an insert assembly employed in an alternative embodiment 70 of the inventive apparatus.
Figure 10:
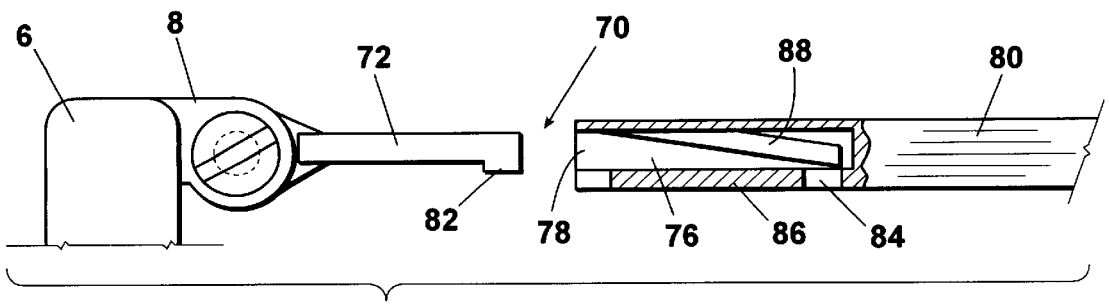
FIG. 10 provides a top view of inventive apparatus 70 with temple piece 80 disconnected from insert piece 72.
Figure 9:
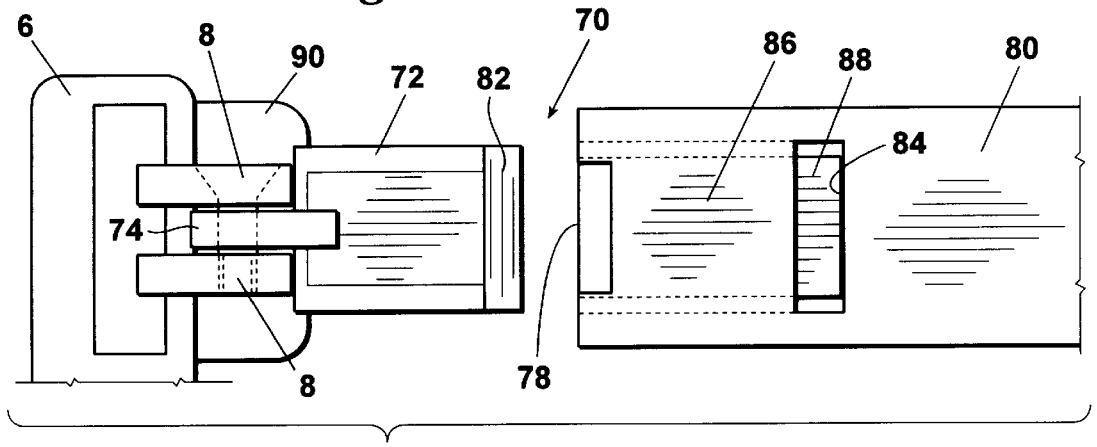
FIG. 9 provides an elevational side view of inventive apparatus 70 with the temple piece 80 thereof disconnected from insert piece 72.
Figure 12:
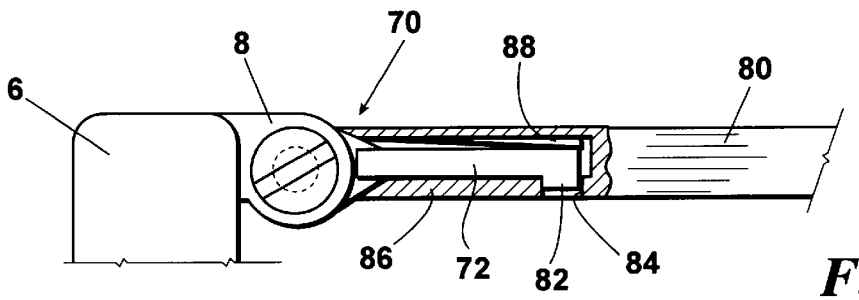
FIG. 12 provides a top view of inventive apparatus 70 with temple 80 connected to insert 72.
Figure 11:
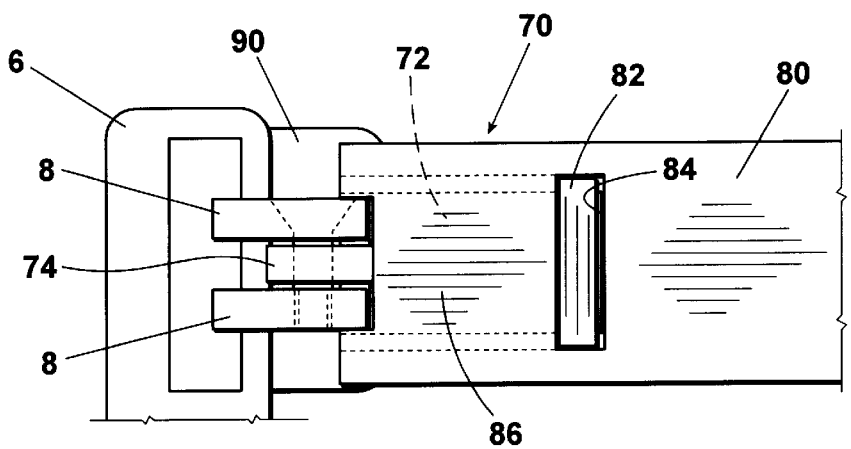
FIG. 11 provides an elevational side view of inventive apparatus 70 with temple 80 connected to insert 72.

Another alternative embodiment 100 of the inventive apparatus is depicted in FIG. 13. Embodiment 100 comprises: a hinged ball-type insert connector 102 pivotably secured at the forward end 104 of a one-piece temple 106 and a corresponding ball connector insert cavity 108 extending laterally into the side of lense frame 110. As will be understood by those skilled in the art, the ball-type insert connector 102 provides a secure connection but can be readily snapped into and out of insert cavity 108. The one-piece temple 106 preferably extends all the way to lense frame 110 such that the inventive attachment apparatus 100 is substantially hidden from outside view. If desired, an extension 90 can be provided on temple 106 or lense frame 110 to conceal the hinge connection.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for releasably attaching a one-piece temple directly to a lense frame, said one-piece temple having a forward end and said lense frame having a hinge and hinge pin provided thereon, said apparatus comprising:

grasping means, at said forward end of said one-piece temple, for releasably, pivotably, and directly grasping said hinge pin such that said forward end of said one-piece temple is positioned directly adjacent to said lense frame and said grasping means is substantially hidden from outside view and finger-operatable actuating means for actuating said grasping means to selectively release and pivotably grasp said hinge pin.

2. The apparatus of claim 1 wherein said grasping means comprises at least one jaw structure which opens when said grasping means is actuated by said finger-operatable actuating means.

3. The apparatus of claim 1 wherein said grasping means comprises a pair of jaw structures which open when said grasping means is actuated by said finger-operatable actuating means.

4. The apparatus of claim 1 further comprising biasing means for biasing said grasping means toward a closed position.

5. The apparatus of claim 1 wherein:

said finger-operatable actuating means comprises a slide bar which is moveable to a first position to open said grasping means and said apparatus further comprises a biasing member which biases said slide bar to a second position to close said grasping means.

6. An apparatus for releasably attaching a temple to a lense frame, said temple having a forward end, said apparatus comprising:

a connector pivotably attached to said lense frame, said connector consisting essentially of a hinge and an insert structure extending from said hinge;

a cavity provided in said forward end of said temple for receiving said insert structure; and holding means for releasably retaining said insert structure in said cavity, wherein, when said insert structure is retained in said cavity and said apparatus is placed on a user's head, said forward end of said temple is positioned directly adjacent said lense frame such that, as to said connector, no more than said hinge thereof will be visible from outside view.

7. The apparatus of claim 6 wherein said holding means is finger-operatable for releasing said insert structure from said cavity.

8. The apparatus of claim 6 wherein said insert structure includes a lip and said holding means comprises:

a slot provided in said temple, said lip being receivable in said slot when said insert structure is inserted into said cavity; and biasing means, provided in said cavity, for releasably holding said lip in said slot.

9. The apparatus of claim 8 wherein said lip is removable from said slot by pressing said lip.

10. The apparatus of claim 6 wherein, when said insert structure is retained in said cavity, said cavity and said lip and said slot are hidden from outside view.

* * * * *